(12) United States Patent
Goradia (10) Patent No.: US 11,939,683 B2
(45) Date of Patent: Mar. 26, 2024

(54) METHOD AND SYSTEM FOR PRODUCTION OF ANTIMICROBIAL DISINFECTANT COATINGS USING ELECTROCHEMICAL SYNTHESIS

(71) Applicant: Prerna Goradia, Mumbai (IN)

(72) Inventor: Prerna Goradia, Mumbai (IN)

(*) Notice: Subject to any disclaimer, the term of this patent is extended or adjusted under 35 U.S.C. 154(b) by 0 days.

(21) Appl. No.: 17/737,332

(22) Filed: May 5, 2022

(65) Prior Publication Data

US 2023/0055027 A1 Feb. 23, 2023

(30) Foreign Application Priority Data

Aug. 6, 2021 (IN) ............................. 202121035625

(51) Int. Cl.
*C25B 11/042* (2021.01)
*A01N 59/16* (2006.01)
*A01N 59/20* (2006.01)
*A01P 1/00* (2006.01)
*C02F 1/20* (2023.01)
(Continued)

(52) U.S. Cl.
CPC ............ *C25B 11/042* (2021.01); *A01N 59/16* (2013.01); *A01N 59/20* (2013.01); *A01P 1/00* (2021.08); *C02F 1/20* (2013.01); *C02F 1/4618* (2013.01); *C02F 1/4672* (2013.01); *C25B 3/00* (2013.01); *C25D 9/02* (2013.01); *C25D 11/00* (2013.01); *C25D 17/10* (2013.01); *C25D 21/04* (2013.01); *C02F 2103/026* (2013.01); *C02F 2201/4619* (2013.01)

(58) Field of Classification Search
CPC ............ A01N 59/16; A01N 59/20; A01P 1/00
See application file for complete search history.

(56) References Cited

U.S. PATENT DOCUMENTS 4,184,974 A * 1/1980 Van Leuven ........ A61Q 17/005
514/495
2002/0123523 A1* 9/2002 Arata ..................... A01N 37/36
514/495
(Continued)

FOREIGN PATENT DOCUMENTS

EP 3219829 A1 * 9/2017 ............ B01J 27/122

OTHER PUBLICATIONS

Viktorija et al, Electrochemical Synthesis of Silver-Based Antiseptic;Nov. 7, 2018 (Year: 2018).*

(Continued)

*Primary Examiner* — Salil Jain
(74) *Attorney, Agent, or Firm* — Ryan Alley IP (57) ABSTRACT

The present disclosure provides a method and system for producing antimicrobial compositions comprising transition metal ions which are generated electrolytically in aqueous solution; chelating agent and excipients; wherein the said ionic species thereby impart stability and longer shelf life and long-term efficacy. Owing to the neutral pH, colorless, odorless, tasteless, non-caustic, non-corrosive nature, the composition of example embodiments shall be used as surface disinfectant and food contact sanitizer and provides an unparalleled combination of high efficacy and low toxicity with instant kill and long-term efficacy. The specific combination of certain metals provides the ability to be extremely broad spectrum and thus works against virus, bacteria, fungi, mold, mildew and antibiotic resistant species as well.

11 Claims, 3 Drawing Sheets

(51) Int. Cl.
*C02F 1/461* (2023.01)
*C02F 1/467* (2023.01)
*C02F 103/02* (2006.01)
*C25B 3/00* (2021.01)
*C25D 9/02* (2006.01)
*C25D 11/00* (2006.01)
*C25D 17/10* (2006.01)
*C25D 21/04* (2006.01)

(56) References Cited

U.S. PATENT DOCUMENTS

2010/0143494 A1* 6/2010 Scheuing .............. C11D 3/046
424/618
2020/0080208 A1* 3/2020 Loff ......................... C25B 1/22

OTHER PUBLICATIONS

English Translation of WO-2020045367 (Year: 2020).*
English Translation of KR-100425983-B1 (Year: 2004).*
English Translation of CN-101389221-A (Year: 2009).*
English Translation of CN-102861102 (Year: 2013).*

* cited by examiner

METHOD AND SYSTEM FOR PRODUCTION OF ANTIMICROBIAL DISINFECTANT COATINGS USING ELECTROCHEMICAL SYNTHESIS

RELATED APPLICATIONS

This application claims priority under 35 U.S.C. § 119 to co-pending IN Application 202121035625, filed Aug. 6, 2021. This IN Application and PCT Application PCT/IN2022/050092 filed Feb. 3, 2022 are incorporated by reference herein in their entireties.

BACKGROUND

Silver and copper metals have been known since ancient times to have good antimicrobial property. The silver compositions have been used as potential disinfectants to prevent spread out of the disease. Cookware and drinking water containers made up of these metals, have been used to prevent the spread of disease. Silver, in fact has been employed as a germicide and antibiotic before modern antibiotics were developed, where people used to infuse silver particles into their drinking water, or submerge whole silver pieces in the drinking water, for the purpose of ingesting the silver by drinking the water.

Besides, due to the nature of silver, many of the presently available silver-based products, however, are unstable and lose the silver to precipitation. Further, in the application as the sterilizing and disinfecting material, it is not suitable for disinfecting the device due to pH or other ingredients, and there is a drawback in that it causes problems such as corrosion. Considering these factors, there is the need of non-toxic, non-acidic formulations which can effectively neutralize microorganisms while maintaining the characteristics of the other formulation matrices.

References have been made to the following literature:

US2014/0206894 published Jul. 24, 2014 to Cole et al. and incorporated by reference herein in its entirety relates to a method and system for production of oxalic acid and oxalic acid reduction products. The production of oxalic acid and oxalic acid reduction products may include the electrochemical conversion of $CO_2$ to oxalate and oxalic acid. The method and system for production of oxalic acid and oxalic acid reduction products may further include the acidification of oxalate to oxalic acid, the purification of oxalic acid and the hydrogenation of oxalic acid to produce oxalic acid reduction products.

U.S. Pat. No. 9,161,544 issued Oct. 20, 2015 to Agrawal et al. and incorporated by reference herein in its entirety relates to compositions having antimicrobial activity containing surface functionalized particles comprising a copper salt which has low water solubility.

WO2008149104 published Dec. 11, 2008 to Bostock et al. and incorporated by reference herein in its entirety relates to an antimicrobial composition comprising an aqueous solution of silver and copper, devices/formulations comprising such a composition and a method of preparing such a composition. The example embodiments also provide a use of a composition to destroy colonies of microorganisms.

U.S. Pat. No. 6,197,814 issued Mar. 6, 2011 to Arata and incorporated by reference herein in its entirety teaches a disinfectant formulated by electrolytically generated silver ions in the presence of citric acid referred to as electrolytically generated silver citrate. As the potential is applied across the electrodes, silver ion tends to migrate towards the cathode & gets deposited thereon thus leaving lesser number of silver ions in the electrolyte to form complex with the acid. Owing to the same, the concentration of silver citrate complex formation is lesser thereby requiring much more time to reach the desired concentration.

U.S. Pat. No. 10,034,478 issued Jul. 31, 2008 to Krasnow et al. and incorporated by reference herein in its entirety discloses antimicrobial compositions comprising surface functionalized particles of low water solubility inorganic copper salts, or such copper salts or silver salts infused into porous particles, their preparation, and combinations of these copper-based particles with other antimicrobial materials, application of the compositions and methods of preparation.

This background provides a useful baseline or starting point from which to better understand some example embodiments discussed below. Except for any clearly-identified third-party subject matter, likely separately submitted, this Background and any figures are by the Inventor(s), created for purposes of this application. Nothing in this application is necessarily known or represented as prior art.

SUMMARY

Example embodiments generally relate to the field of electrochemical reactions. More particularly, example embodiment relates to a method and system for production of antimicrobial formulations comprising electrolytically generated metal ions, chelating agents and excipients. The disinfectant has broad spectrum action against virus, bacteria and fungus. The principal object of the embodiments herein is to overcome the drawbacks in the prior art and provide a method and system for producing antimicrobial compositions comprising silver, copper ions which are generated electrolytically in aqueous solution; chelating agent and excipients; wherein the said ionic species thereby impart stability and longer shelf life and long-term efficacy. Owing to the neutral pH, the composition of example embodiments shall be used as surface disinfectant and food contact sanitizer and provides an unparalleled combination of high efficacy and low toxicity with instant kill and long-term efficacy.

Example embodiments attempt to overcome the problems faced in the prior art and disclose a method and system for production of antimicrobial disinfectant formulations comprising electrolytically generated metal ions such as silver, zinc and copper; chelating agent and excipients. The disclosure mainly describes an environment friendly, non-toxic electrolytic disinfectant formulation which is effective at neutral pH. Being a neutral pH disinfectant minimizes the corrosion of surroundings such as Stainless Steel and other metal surfaces being used in contact. It can be used for hard surfaces and food contact surfaces and is gentle enough to be used in childcare environments.

Accordingly, example embodiments provide a method and system for the production of aqueous disinfectant coatings having a stable ionic form of metals like silver, copper or in combination thereof, having significant ability to kill or disabling microorganisms. The anti-microbial compositions have an extended useful shelf-life characterized by its non-corrosive nature. The resultant formulation, a colorless formulation at its working concentration is odorless, non-caustic and formulates well with other compounds, thereby enabling safe usage on human skin, without any adverse side effects.

An example method includes preparing an aqueous antimicrobial disinfectant formulation, comprising: a) weighing 70-90% of water in a mixer vessel and deoxygenating it; b)

preparing a matrix by addition of chelating agents in the deoxygenated water obtained in step a; c) adding pH adjusters to maintain pH in the range of 7 to 9; d) transferring the electrolyte solution obtained in step c to an electrochemistry vessel; e) applying potential difference across at least one anode and at least one cathode electrode in the electrolytic solution in the electrochemistry vessel; f) applying controlled volumes of pressurized inert gas in the electrolytic solution by a gas sparger; g) filtering the solution by an additional parallel filtration assembly in semi dark conditions; wherein at least one anode electrode is selected from a group comprising transition metals and at least one cathode electrode is selected from a group comprising inert and conductive materials, wherein potential difference is applied across the electrodes to drive a current; h) transferring the composition obtained in step g to a storage vessel and adding an excipient with gentle stirring for 15-20 minutes at room temperature and under semi-dark conditions.

An example embodiment includes a process wherein at least one anode electrode is selected from the group comprising silver and copper, but not limited to. Further, at least one cathode electrode is selected from the group comprising stainless steel, mild steel, boron, diamond, graphite, platinum, silver, copper and combinations thereof. Further, the cathode and anode electrodes may be of same or different material.

In an embodiment the excipient in the method is selected from a group comprising polymers and thickening agents and combinations thereof. The polymer is selected from a group comprising hydrophilic bio polymers such as poly vinyl pyrrolidone, polyethylene glycol, poly vinyl alcohol and combinations thereof, but not limited to. Since the formulation is safe to be used with mixing alcohols some other polymer systems could also be used such as the urethanes, acrylates but not limited to. Further, a thickening agent may be added to the composition for prolonged slow release of the antimicrobial ionic species. For this purpose, the thickening agent is selected from a group comprising carbomer, a cross-linked polymer of acrylic acid (polyacrylic acid), alginates, pectin, carrageenan, gellan, gelatin, agar, modified starch, methyl cellulose and hydroxypropylmethyl cellulose.

Another embodiment discloses a process wherein the chelating agent is selected from a group comprising of disodium salt of EDTA. The EDTA salt is further selected from the group comprising of ethylenediaminetetraacetic acid (EDTA) salts such as disodium EDTA, diethylene triamine pentaacetic acid sodium salt, sodium calcium edetate, and tetrasodium EDTA, dimercapto-succinic acid, dimercapto-propane sulfonate, salts of diethylene triamine pentacetic acid, editronic acid, 1-Hydroxyethylidene-1,1-diphosphonic acid (HEDP), Nitrilo Triacetic Trisodium Salt (NTA salt) and dimercaptol, but not limited to.

In still another embodiment the sparging is with any gas selected from a group of inert gases nitrogen, argon, but not limited to, for enhancing the rate of reaction and the parallel filtration assembly comprises a peristaltic pump having filter with adsorption column for simultaneous filtering of the solution.

In yet another embodiment the voltage is applied across the electrodes to drive a current, thereby delivering the ions into the electrolyte.

Another embodiment discloses an electrochemical system for preparing antimicrobial disinfectant compositions, wherein the system (100) comprises: a) a vessel (101) holding an electrolytic medium with neutral salts such as that of disodium salt of EDTA about 2-10% in water by weight; b) at least one anode (102a) and at least one cathode (102b) electrode selected from a group comprising transition metals and conductive materials respectively, dipped in the said electrolytic solution; c) a gas sparger (103) for applying controlled volumes of pressurized inert gas in the electrolytic solution; d) a parallel filtration assembly (104); and e) a voltage converter (105) to apply potential difference across the cathode and anode electrodes to establish a flow of silver ions between the two electrodes; wherein an inert gas blanket and semi dark conditions are maintained throughout the solution.

Another example embodiment is a process of preparing an antimicrobial disinfectant formulation wherein the electrolytically generated transition metal ions comprise of silver ions in the concentration of 0% to 2% by weight.

Yet another example embodiment relates to an antimicrobial disinfectant formulation, comprising an aqueous solution of transition metal ions wherein the pure ions are electrolytically generated in the aqueous solution of ionic compounds selected from a group of salt of EDTA solution.

Another example embodiment includes a formulation for disinfecting the surface may be in the form of a powder, tablet or capsule containing the antimicrobial powder, or antimicrobial solutions in the form as aerosols, infusions, sprays, mist, drops, or one or more liquids formulations, but not only limited to.

BRIEF DESCRIPTIONS OF THE DRAWINGS

Example embodiments will become more apparent by describing, in detail, the attached drawings, wherein similar elements are represented by similar reference numerals. The drawings serve purposes of illustration only and thus do not limit example embodiments herein. Elements in these drawings may be to scale with one another and exactly depict shapes, positions, operations, and/or wording of example embodiments, or some or all elements may be out of scale or embellished to show alternative proportions and details.

DETAILED DESCRIPTION

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

Membership terms like "comprises," "includes," "has," or "with" reflect the presence of stated features, characteristics, steps, operations, elements, and/or components, but do not themselves preclude the presence or addition of one or more other features, characteristics, steps, operations, elements, components, and/or groups thereof. Rather, exclusive modifiers like "only" or "singular" may preclude presence or addition of other subject matter in modified terms. The use of permissive terms like "may" or "can" reflect optionality such that modified terms are not necessarily present, but absence of permissive terms does not reflect compulsion. In listing items in example embodiments, conjunctions and inclusive terms like "and," "with," and "or" include all combinations of one or more of the listed items without exclusion. The use of "etc." is defined as "et cetera" and indicates the inclusion of all other elements belonging to the same group of the preceding items, in any "and/or" combination(s). Modifiers "first," "second," "another," etc. may be used herein to describe various items, but they do not confine modified items to any order. These terms are used only to distinguish one element from another; where there are "second" or higher ordinals, there merely must be that many number of elements, without necessarily any difference or other relationship among those elements.

When an element is related, such as by being "connected," "coupled," "on," "attached," "fixed," etc., to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.).

As used herein, singular forms like "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to the same previously-introduced term. Relative terms such as "almost" or "more" and terms of degree such as "approximately" or "substantially" reflect 10% variance in modified values or, where understood by the skilled artisan in the technological context, the full range of imprecision that still achieves functionality of modified terms. Precision and non-variance are expressed by contrary terms like "exactly."

The structures and operations discussed below may occur out of the order described and/or noted in the figures. For example, two operations and/or figures shown in succession may in fact be executed concurrently or may be executed in the reverse order, depending upon the functionality/acts involved. Similarly, individual operations within example methods described below may be executed repetitively, individually or sequentially, so as to provide looping or other series of operations aside from exact operations described below. It should be presumed that any embodiment or method having features and functionality described below, in any workable combination, falls within the scope of example embodiments.

The inventor has recognized that despite the widespread use of copper and silver ions, they have a limited stable ionic life. Moreover, many silver products fail to maintain the silver particles in suspension, either because the silver solution is not a true colloid or because it is otherwise unstable. Accordingly, there is a need to create a pH neutral, non-toxic stable metal ionic formulation, which could be electrolytically generated in a high concentration within a short duration of time. To overcome these newly-recognized problems as well as others, the inventor has developed example embodiments and methods described below to address these and other problems recognized by the Inventors with unique solutions enabled by example embodiments.

The present invention is antimicrobial disinfectants and systems and methods for producing the same. In contrast to the present invention, the few example embodiments and example methods discussed below illustrate just a subset of the variety of different configurations that can be used as and/or in connection with the present invention.

Example embodiments relate to a method for generating anti-microbial formulations which can effectively neutralize microorganisms on the hard surfaces by providing for a light stable, antimicrobial aqueous disinfectant comprising of silver salts with bio polymer and chelating agent. Example embodiments further disclose a non-toxic disinfectant with neutral pH, comprising of active metal salts for disinfection and method of preparing the same. The resultant formulation is colourless and odourless. The solid content in the aqueous formulation comprises only ~6-7% wt/volume. The biopolymers and chelating agents are widely used materials in the food and cosmetics industry and are not known to bio-accumulate or cause eco-toxicity.

Example embodiments relate to a method and system for generating antimicrobial formulation of electrolytically generated metal ions as a stabilized ionic disinfectant where the specific combination of metal ions gives it the ability to be effective and work in a broad spectrum against potentially pathogenic bacteria, virus, fungi, mold, mildew and antibiotic resistant species.

Figure 1:
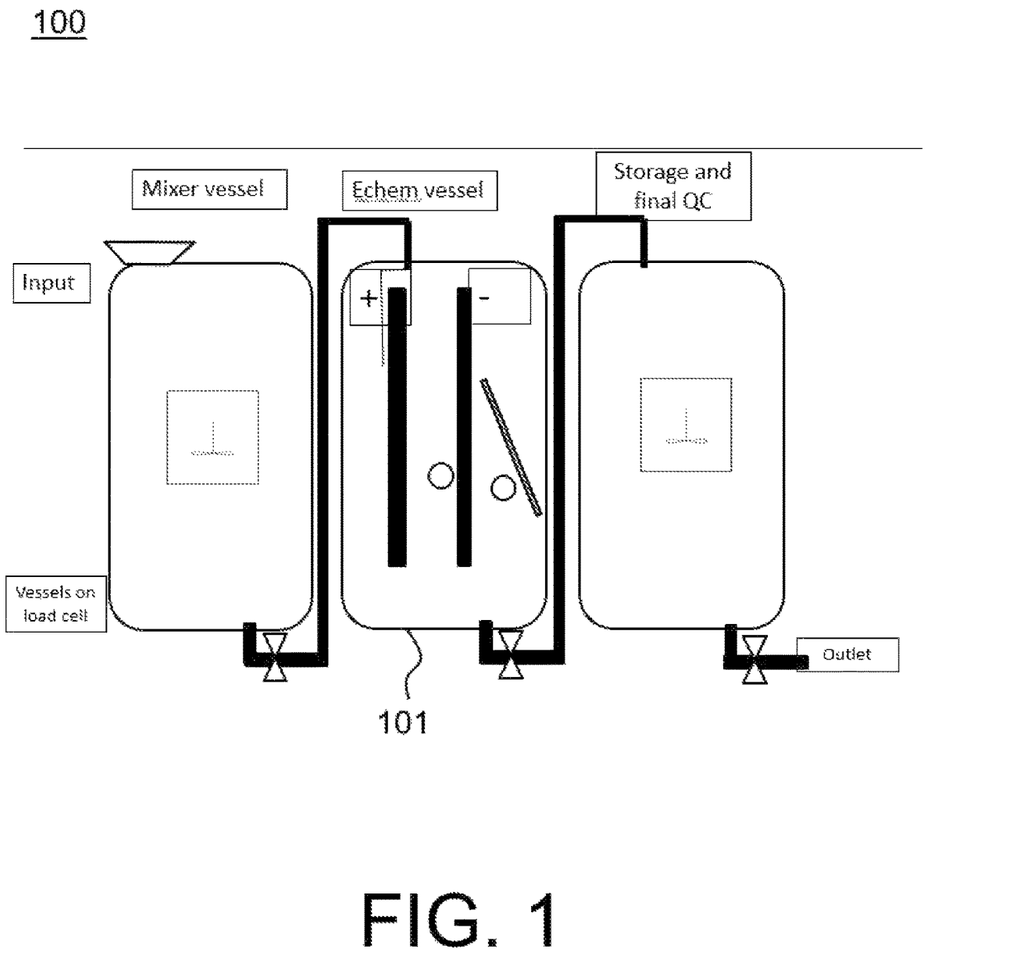
FIG. 1 is a pictorial representation of the set-up for the process of generating the antimicrobial disinfectant formulation, in accordance with an example embodiment.
Figure 2:
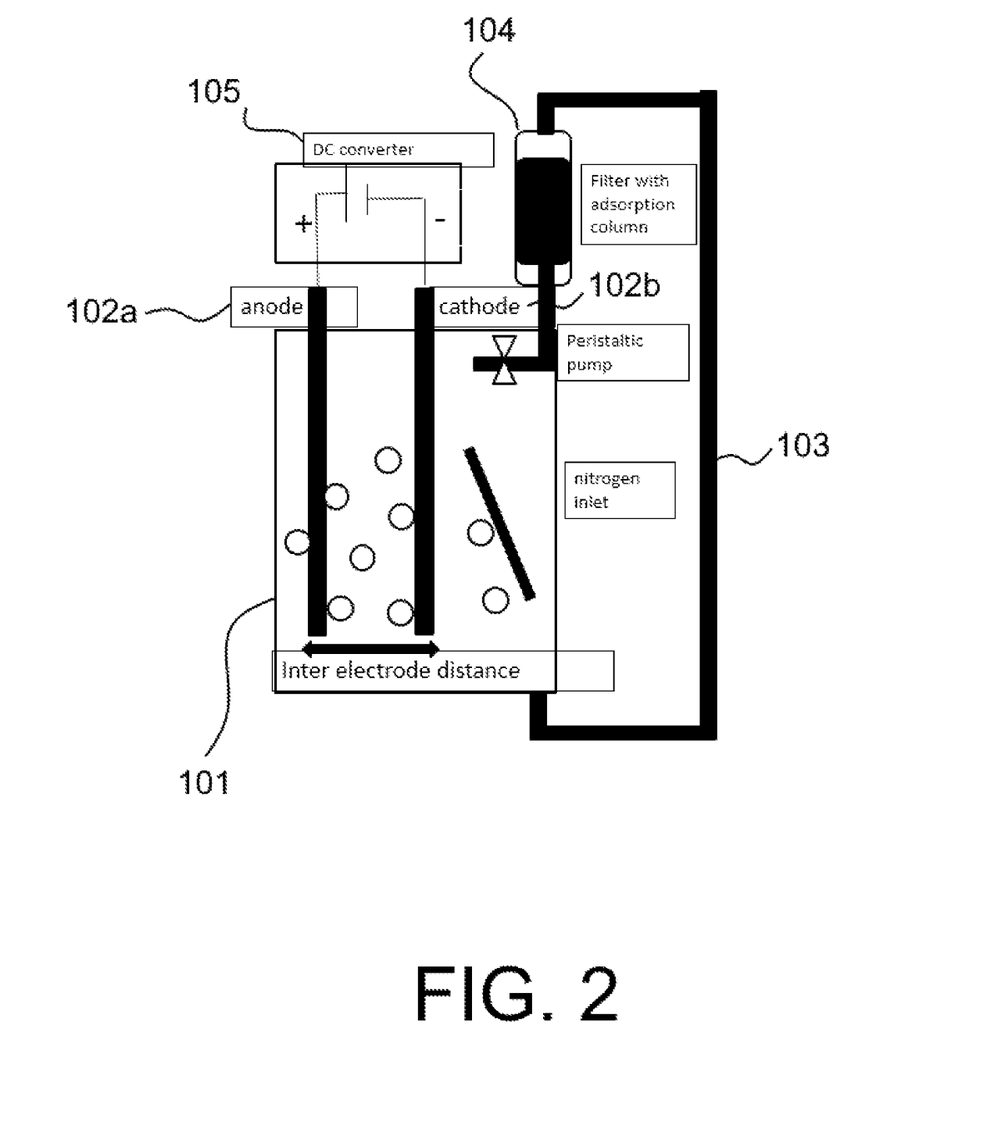
FIG. 2 illustrates diagrammatic representation of the system for the electrochemical process, in accordance with an example embodiment.

Reference may be made to FIG. 1 illustrating the pictorial representation of the set-up for the process of generating the antimicrobial disinfectant formulation, in accordance with an example embodiment;

Reference may be made to FIG. 2 illustrating the diagrammatic representation of the system for the electrochemical process, in accordance with an example embodiment. A typical electrochemical system (100) of the example embodiments entails the using of EDTA salts as an electrolytic medium contained in a vessel (101), as shown in FIG. 1, and transition metal selected from a group of copper and silver metals as anode electrode (102a). A stainless-steel electrode is generally used as cathode electrode (102b). The said electrodes (both cathode and anode) are preferably formed from 99.99 percent pure metal having impurities lesser than 100 ppm. Each electrode is having a dimension of 100 mm×180 mm and thickness of 2 mm. The anode is spaced apart from the cathode at a distance of around 10 cm. An electric potential of 2-5 V is applied on to the electrodes and the reaction is continued for at least 30 minutes. A gas sparger (103) having a hollow metal ring with a hose coupled thereto is introduced into the solution for introducing controlled amount of pressurized gas in the form of bubbles.

The sparging procedure by breaking the diffusion layer around the electrodes, improves the reaction rate and allows the formation of metal complexes of silver EDTA etc. depending on the type of electrolytes used. 500 ml of electrolyte is utilized in a batch and the temperature of the electrolytic cell is maintained at room temperature which is generally between 25 to 35° C. The peristaltic pump (104) is introduced into the electrochemical cell for enhancing the efficacy of the reaction by convection and simultaneous filtering of the composition prepared thereto. This gas sparging for enhancing the efficacy of the reaction and neutral pH of the formulation is a novel feature of the example embodiment. When direct current by a voltage converter (105) is applied onto the electrodes, metal ions are generated which react with the electrolytic solution to form metal complexes.

Figure 3:
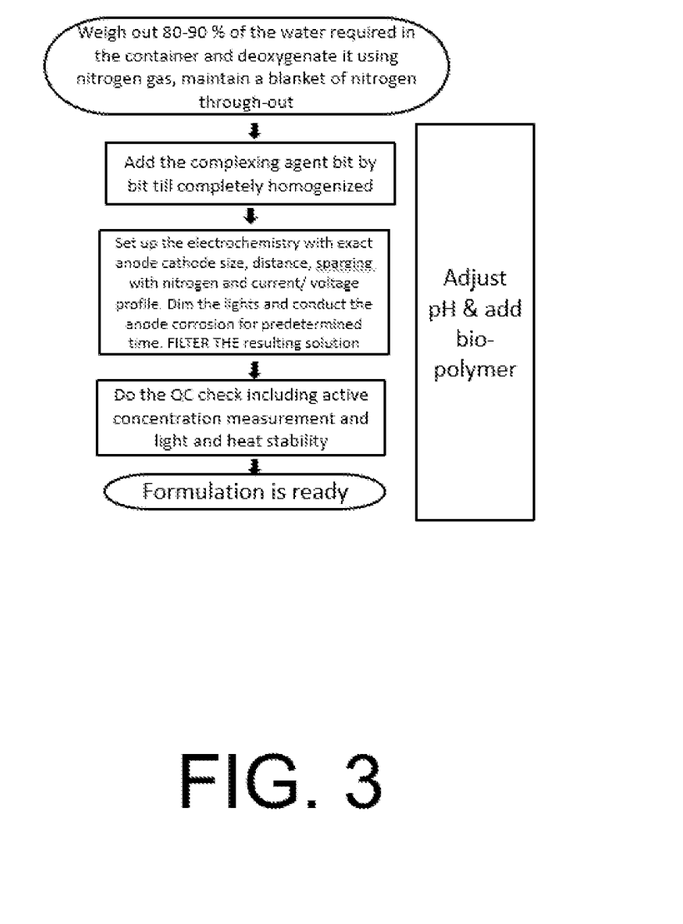
FIG. 3 illustrates the flow-chart for the synthesis of the formulation, in accordance with an example embodiment.

Reference may be made to FIG. 3 illustrating the flowchart for the synthesis of the formulation, in accordance with an example embodiment.

An example embodiment discloses a method and system for producing anti-microbial disinfectant formulations, which can effectively neutralize microorganisms on the hard surfaces and food contact surfaces by providing for a nontoxic, light stable, antimicrobial aqueous disinfectant comprising of silver salts with bio polymer and chelating agent. The said formulation is colorless, odorless, non-caustic with a near neutral pH. It may also be available in a powder form or spray, liquid or tablet and is effective against a wide range of microorganisms without the need of parabens, formaldehyde, halogens or quaternary ammonium compounds.

An example method includes preparing an aqueous antimicrobial disinfectant formulation, comprising the steps: a) weighing 70-90% of water in a mixer vessel and deoxygenating it; b) preparing a matrix by addition of chelating agents in the deoxygenated water obtained in step a; c) adding pH adjusters to maintain pH in the range of 7 to 9; d) transferring the electrolyte solution obtained in step c to an electrochemistry vessel; e) applying potential difference across at least one anode and at least one cathode electrode in the electrolytic solution in the electrochemistry vessel; f) applying controlled volumes of pressurized inert gas in the electrolytic solution by a gas sparger; g) filtering the solution by an additional parallel filtration assembly in semi dark conditions; wherein at least one anode electrode is selected from a group comprising transition metals and at least one cathode electrodes is selected from a group comprising inert and conductive materials, wherein potential difference is applied across the electrodes to drive a current; h) transferring the composition obtained in step (g) to a storage vessel and adding an excipient with gentle stirring for 15-20 minutes at room temperature and under semi-dark conditions.

An example embodiment discloses a method wherein at least one anode electrode is selected from the group comprising silver and copper, but not limited to. Further, at least one cathode electrode is selected from the group comprising stainless steel, mild steel, boron, diamond, graphite, platinum, silver, copper and combinations thereof. Further, the cathode and anode electrodes may be of same or different material.

In an embodiment excipient in the method is selected from a group comprising polymers and thickening agents and combinations thereof. The polymer is selected from a group comprising hydrophilic bio polymers such as poly vinyl pyrrolidone, polyethylene glycol, poly vinyl alcohol and combinations thereof, but not limited to. Since the formulation is safe to be used with mixing alcohols some other polymer systems could also be used such as the urethanes, acrylates but not limited to. Further, a thickening agent may be added to the composition for prolonged slow release of the antimicrobial ionic species. For this purpose, the thickening agent is selected from a group comprising carbomer, a cross-linked polymer of acrylic acid (polyacrylic acid), alginates, pectin, carrageenan, gellan, gelatin, agar, modified starch, methyl cellulose and hydroxypropylmethyl cellulose.

Another example embodiment discloses a process wherein the chelating agent is selected from a group comprising of disodium salt of EDTA. The EDTA salt is further selected from the group comprising of ethylenediaminetetraacetic acid (EDTA) salts such as disodium EDTA, diethylene triamine pentaacetic acid sodium salt, sodium calcium edetate, and tetrasodium EDTA, dimercaptosuccinic acid, dimercapto-propane sulfonate, salts of diethylene triamine pentacetic acid, editronic acid, 1-Hydroxyethylidene-1,1-diphosphonic acid (HEDP), Nitrilo Triacetic Trisodium Salt (NTA salt) and dimercaptol, but not limited to.

In still another embodiment the sparging is with any gas selected from a group of inert gases nitrogen, argon, but not limited to, for enhancing the rate of reaction and the parallel filtration assembly comprises a peristaltic pump having filter with adsorption column for simultaneous filtering of the solution.

In yet another embodiment the voltage is applied across the electrodes to drive a current, thereby delivering the ions into the electrolyte.

An example embodiment discloses an electrochemical system for preparing antimicrobial disinfectant compositions, wherein the system (100) comprises: a) a vessel (101) holding an electrolytic medium with neutral salts such as that of disodium salt of EDTA about 2-10% in water by weight; b) at least one anode (102a) and at least one cathode (102b) electrode selected from a group comprising transition metals and conductive materials, dipped in the said electrolytic solution; c) a gas sparger (103) for applying controlled volumes of pressurized inert gas in the electrolytic solution; d) a parallel filtration assembly (104); and e) a voltage converter (105) to apply potential difference across the cathode and anode electrodes to establish a flow of metal ions between the two electrodes; wherein an inert gas blanket and semi dark conditions are maintained throughout the solution.

Another example embodiment is a process of preparing an antimicrobial disinfectant formulation wherein the electrolytically generated transition metal ions comprise of silver ions in the concentration of 0% to 2% by weight.

Another example embodiment relates to an antimicrobial disinfectant formulation, comprising an aqueous solution of transition metal ions wherein the pure ions are electrolytically generated in the aqueous solution of ionic compounds selected from a group of salt of EDTA solution.

In a preferred embodiment the formulation for disinfecting the surface may be in the form of a powder, tablet or capsule containing the antimicrobial powder, or antimicrobial solutions in the form as aerosols, infusions, sprays, mist, drops, or one or more liquids formulations, but not only limited to. Further, the disinfectant shows instant kill activity with decontaminating the surface within 30 seconds of exposure time, wherein the surface is a hard surface.

EXAMPLE 1

For the generation of the formulations, silver ions were introduced electrochemically in an aqueous solution comprising sodium EDTA. In example embodiments, the quantities of the complexing agent and the pH adjuster had to be maintained to keep the formulation stable with pH 7-8. From the approximate charge passed in the reaction the theoretical amount of silver was calculated and the efficiency of the reaction was about 60%.

TABLE 1

Anti-microbial formulations with different ratio of EDTA and polymer

| | Chemical | Anode/cathode and time | Titration result for Ag | Theoretical. Charge passed, (concentration of Ag expected) | Sunlight and thermal stability |
|---|---|---|---|---|---|
| Test composition 1 | 30 g EDTA + NaOH + 30 g PVP pH = 8 | Silver anode and SS cathode, 2 hr SS had a bright deposit of silver | 9.4 mL = 1014 ppm of Ag | 504 coulomb | The solution is clear in color, slight yellow tinge. Stable with sunlight and heat |
| Test composition 2 | 100 g EDTA + NaOH + 10 g PVP pH = 8-9 | Silver anode and SS cathode, 2 hr SS had a bright deposit of silver | After 2 hrs: 21.5 mL = 2319 ppm of Ag | 3600 coulomb | solution is clear yellow in color, Stable with sunlight and heat after 1:15 dilution |

The Test composition 1 was a model formulation and the zones of the gram positive and gram-negative bacteria were studied. The detailed germicidal spray data was also collected and reported for the 1:4 dilution of the above. Increasing EDTA in Test composition 2 yielded even greater release of the silver ions. Though, the efficiency was on the lower side, the composition gave good results in the microbiological study depicted by the zone of inhibition.

EXAMPLE 2

ASTM B-117 salt spray test and ATP data: A corrosion test was done to provide corrosion resistance information of the disinfection coating sprayed on the stainless-steel (SS) panels. SS panels were sprayed with the disinfection formulation according to the normal use patterns and control SS panels without the coating were also studied. The NaCl concentration (w/v %) was set at 4.0-6.0 and the saturation air temperature was 47±0.1° C. with pH in the range of 6.5-7.2. The temperature of the saltwater tank and the chamber were both 35±0.1° C. The compressed air was set at 1±0.1 kg/cm2.

No Red or White rust was observed in the stainless-steel panels treated with the anti-microbial composition even after 48 hrs. The results of ASTM B-117 salt spray test stated that the composition was corrosion resistant.

Further, the formulation was sprayed onto various surfaces and the readings recorded using an Adenosine Triphosphate meter. The solution containing the biopolymer showed a very stable reading of around 10 RLU consistently on a working wood table substrate over a period of 45 days. This also practically proves the residual efficacy of the formulation containing the biopolymer.

EXAMPLE 3

Germicidal Spray Test: 10 ul vol. of approx. 1-5×106 CFU/ml of cell cultures was applied on to sterile SS substrates (1"×1") which were placed individually into separate plates. The above substrate was left for drying into the incubator at 37° C. for 40 min. After drying, the SS substrate was exposed to the test formulation in a spray form from a distance of about 1 foot, It was placed into different sterile petri dishes and neutralizing media was poured into each SS carrier. Each sample was vortexed for 2 min to facilitate the release of the carrier load from the sample surface into neutralizing broth. The analysis was then performed. Their controls were plated with SCDA (Soybean Casein Digest Agar Plate) by taking 1 ml volume. The plates were incubated at 37° C. for 48 hours. After incubation the readings were taken with the help of colony counter and the results were interpreted.

Antimicrobial activity of Test composition 1 against *S. aureus* was also tested. The Test composition 1 when compared with the untreated samples as reference sample on SS substrate showed 99.9999% reduction for antimicrobial activity against *S. aureus* bacteria (Table 2& 3). Further, the antimicrobial activity of the Test composition was checked upon further diluting it to 1:4 and exceptional broad-spectrum ability of the composition for the different strains of bacteria and of fungus was shown with the test results as mentioned below (Tables 4, 5, and 6).

TABLE 2

Neutralizer Test Results of Test composition 1 against *S. aureus*: with Initial Cell Concentration: 5.1 × 10$^6$ cfu/ml

| Test | Particulars | Control | Test Results | % Recovery of control |
|---|---|---|---|---|
| Test A Neutralizer Effectiveness | Avrika + DENA + Organisms | 88 | 79 | 89.77 |
| Test B Neutralizer toxicity | DENA + Organisms | | 81 | 92.04 |
| Test C Test Organisms Viability | Phosphate buffer + organisms | | 85 | 96.59 |

TABLE 3

Antimicrobial activity results of Test composition 1 against *S. aureus*

| | Test composition | % Reduction | Log value | Antibacterial activity (Log reduction) |
|---|---|---|---|---|
| Bacteria on untreated SS Substrate | 4.9 × 10$^6$ | — | 6.6901 | — |
| Bacteria on Treated SS Substrate | <1 | 99.99998 | 0 | 6.6901 |

TABLE 4

Neutralizer Test Results of Test composition 1 after 1:4 V/V dilution

| Test | Particulars | Control | Test Results | % Recovery of control |
|---|---|---|---|---|
| Test A Neutralizer Effectiveness | Avrika + DENA + Organisms | 89 | 86 | 96.6292 |
| Test B Neutralizer toxicity | DENA + Organisms | | 88 | 98.8764 |
| Test C Test Organisms Viability | Phosphate buffer + organisms | | 87 | 97.7528 |

TABLE 5

Antimicrobial activity of Test composition 1 after 1:4 V/V dilution against *P. aeruginosa*: with Initial Cell Concentration: $3.7 \times 10^6$ cfu/ml

| | Test composition | % Reduction | Log value | Antibacterial activity (Log reduction) |
|---|---|---|---|---|
| Bacteria on untreated SS Substrate | $3.2 \times 10^6$ | — | 6.5051 | — |
| Bacteria on Treated SS Substrate | <1 | 99.99997 | 0 | 6.5051 |

TABLE 6

Antimicrobial activity of Test composition 1 after 1:4 dilution against *M. Furfur*: with Initial Cell Concentration: $2.7 \times 10^6$ cfu/ml

| | Test composition | % Reduction | Log value | Antibacterial activity (Log reduction) |
|---|---|---|---|---|
| Bacteria on untreated SS Substrate | $2.5 \times 10^3$ | — | 3.3979 | — |
| Bacteria on Treated SS Substrate | <1 | 99.96 | 0 | 3.3979 |

The test composition 1 (after 1:4 dilution) when compared with untreated sample as reference sample on SS substrate showed 99.99997 and 99.96% reduction for antimicrobial activity against *P. aeruginosa* and *M. furfur* bacteria.

EXAMPLE 4

Interim Test Data: The interim method includes an efficacy assessment of the coated coupons following exposure to certain chemical solutions/mechanical abrasion. The motivation is to check for supplemental residual efficacy when the disinfection events are well spaced out. The test method provides for the evaluation of durability and the baseline efficacy of these treated surfaces against *Staphylococcus aureus* and *Pseudomonas aeruginosa*; the method can be adapted for additional microbes and viruses. A minimum 3 log reduction of test microbes within 1-2 hours is the required level of performance. The USEPA interim method to support efficacy requirements for the registration of coatings applied to surfaces that are intended to provide residual antimicrobial activity for a period of weeks and are designed to be supplements to standard disinfection practices.

In brief, the test method comprised of two parts: 1) chemical treatment and abrasion, and 2) product efficacy. The method used 1"×1" brushed stainless-steel carriers coated with the antimicrobial chemical and uncoated control carriers were exposed to 10 cycles of chemical treatment/abrasion in order to support a 1-week duration label claim of residual activity. Testing could be scaled up to support longer claims up to 4 weeks. The chemical exposure and abrasion processes were intended to represent a degree of normal and relevant physical wear, as well as reproduce potential effects resulting from repeated exposure of antimicrobial coated surfaces to three different biocidal materials (chemical solutions) as well as the impact of dry abrasion. Under controlled environmental conditions, the carriers received a 20 μL mixture of the test organism and soil load. Following a recommended 1-2 hour contact time, the carriers were neutralized and the number of viable microorganisms was determined quantitatively. The log reduction (LR) in the viable test organisms on exposed carriers was calculated in relation to the viable test organisms on the unexposed control carriers. The impact of the chemical exposure and abrasion on product efficacy was also determined by comparing carriers with and without coating not exposed to chemical treatment and abrasion.

The chemical exposure/abrasion cycle for a single chemical (Treatments A, B, and C) was done using a wetted sponge with a weight of 454 g. The dry abrasion treatment (Treatment D) was done using a dry sponge without additional weight to perform sixteen single passes across the carriers. 10 abrasion cycles were performed (80 single passes across the surface of the carrier for treatments A, B, and C; 160 single passes across the surface of the carrier for Treatment D with appropriate dry times between abrasion cycles on Lot 1 to support a 1-week residual claim. The number of abrasion cycles performed was made for residual claims of 4 weeks. The results were promising in that the mechanical abrasion in the wet and dry states showed a 4 log reduction. In the presence of cleaning chemicals also there was a good antimicrobial ability.

TABLE 7

Interim Test results for Test composition 1

| | | *Ps. Aeruginosa* | | | | | |
|---|---|---|---|---|---|---|---|
| Name of Organism | | Count | | | Count | | |
| Chemical Treatment | Coated | Observed CFU/ml | Log Value | Without coated | observed CFU/ml | Log Value | % reduction |
| — | 1C | Nil | 0* | 6 WC-Plain SS | 660 | 4.30 | 99.84 |
| Lysol | 2C-A | Nil | 0* | 7 WC-A | Nil | 0* | 0 |

TABLE 7-continued

Interim Test results for Test composition 1

| | | | | Ps. Aeruginosa | | |
|---|---|---|---|---|---|---|
| Name of Organism | Count | | | Count | | |
| Chemical Treatment | Coated | Observed CFU/ml | Log Value | Without coated | observed CFU/ml | Log Value | % reduction |
| Sanidate 6% | 3C-B | Nil | 0* | 8 WC-B | Nil | 0* | 0 |
| NaOCl-2000 ppm | 4C-C | Nil | 0* | 9 WC-C | 1230 | 3.09 | 99.91 |
| — | 5C-Dry | Nil | 0* | 10 WC-Dry | 26000 | 4.41 | 99.95 |
| Control | Positive control Media control Neutralizer control | | | | $2.8 \times 10^8$ CFU/ml No Turbidity No Turbidity | | |

As per the above observations it was concluded that the test sample showed 4 log reductions and (99.995%) bactericidal activity when compared to the without coated carrier specimen both in the wet and dry. For the coated specimen treated with 3 chemical treatments:

Lysol solution that contains quaternary ammonium salts was compared with uncoated specimen. There were no colonies (growth) observed either on the coated sample or on the uncoated samples at the experimental conditions.

Sanidate cleaner containing 6% hydrogen peroxide solution was compared with uncoated specimen. There were no colonies (growth) observed either on the coated sample or on the uncoated samples at the experimental conditions.

Sodium hypochlorite solution compared with uncoated specimen showed 99.91% reduction. There were no colonies (growth) observed on the coated sample whereas for the uncoated there were 1230 colonies observed. Overall, promising results were obtained with the coated samples wherein nil microbial counts were observed in all cases. 4 log reductions were observed in the study with mechanical abrasion in the wet and dry conditions.

EXAMPLE 5

Skin safe test. Similar formulations have yielded skin safe results. The current formulations do not have any counter ions as they are generated electrochemically and not from salts and are even expected to be safer and non-toxic.

EXAMPLE 6

Storage Stability Test: 14-day oven stability test: The Test composition 1 was kept in the oven at 54° C. for 14 days, no discoloration of the formulation was seen. The anti-microbial activity was intact even after 14 days of keeping in oven. Further analysis confirmed that the active ion concentration was also same when checked after storage in oven (Table 8).

TABLE 8

Data for 14-day oven stability test

| | Titration result | Zone of Inhibition | |
|---|---|---|---|
| | | S. aureus | Pseudomonas |
| Day 0 | 1014 ppm | 22.08 mm | 19.26 mm |
| Day 14 | 1014 ppm | 19.20 mm | 23.56 mm |

EXAMPLE 7

Particle analysis: The particle analysis was done using a Laser Diffraction (LD) analyzer, a particle size analyzer that used three precisely placed red laser diodes to accurately characterize particles by utilizing Mie compensation for spherical particles and the proprietary principle of modified Mie calculations for non-spherical particles. The resolution of the tool was from 0.01 to 2,800 μm. Any light obscuration depicts the presence of nanoparticles in the composition. The results did not show any light obscuration and no particles were detected in the range. The experiments were repeated thrice and the absence of any light obscuration thereby confirmed that there was no nanoparticle contamination in the disinfectant composition.

EXAMPLE 8

Food safety Test Data: The food safety was assessed using the global migration test where the parts (in sets of 25) were submerged in distilled water for 24 hours at 49° C. The USFDA 175.300 test limits are 1.8 and 18 mg/inch2 for single use and repeated use. The result obtained was 0.06 mg/in2 which is well within the limits for safe food use. These results thereby confirmed that the coating is safe for the intended use with beverages and food and for repeated use for room temperature filling and storing. The results are provided in the following table 9.

TABLE 9

Data for food safety test

| Test Parameter | Simulant (Temp/ Time) | Amount of Extractives $mg/in^2$ | Limits as per USFDA-175.300 $mg/in^2$ | Test Method |
|---|---|---|---|---|
| Global Migration Test | Distilled water (49° C./ 24 hrs) | 0.06 | 1.8 for single use 18 for repeated use | USFDA-175.300 1st April, 2020 |

In accordance with advantages of example embodiments as compared with the existing formulations, example embodiments provide a big change in the field of antimicrobials. The example embodiments are to provide a method of making aqueous disinfectant coatings which may be packaged in a concentrated aqueous form as scalable formulations. Further, the method of producing the formulation may be electrolytically generated in a batch process or a continuous process. The aqueous disinfectant with longer shelf life based on electrolytically generated silver and copper, is a non-toxic environment friendly aqueous disinfectant disclosed for specific use such as prevention against contamination by potentially pathogenic bacteria and virus. The aqueous disinfectant is formulated by electrolytically generating metallic ions in water as well as aqueous solution comprising salts. The aqueous disinfectant has been shown to be very effective for eliminating standard indicator organisms such as *Staphylococcus aureus, Salmonella cholerasuis* and *Pseudomonas aeruginosa* and also fungus such as *Aspergillus niger, M. furfur* and *Candida albicans*. The specific combination of certain metals imparts it the ability to be extremely broad spectrum and thus works against fungi, mold, mildew and antibiotic resistant species as well. These formulations can be further utilized on hard surfaces as well as food contact surfaces as efficient surface disinfectant. The antimicrobial formulations being gentle enough to be used in childcare environments provide an unparalleled combination of high efficiency and low toxicity with instant kill and long-term efficacy.

Some example embodiments and methods thus being described, it will be appreciated by one skilled in the art that examples may be varied through routine experimentation and without further inventive activity. For example, although liquid solutions are generated in some example systems, it is understood that other delivery forms including powders and tablets are useable with examples. Variations are not to be regarded as departure from the spirit and scope of the example embodiments, and all such modifications as would be obvious to one skilled in the art are intended to be included within the scope of the following claims.

The invention claimed is:

1. A method of preparing an aqueous antimicrobial disinfectant formulation, the method comprising:
   deoxygenating water;
   adding ethylenediaminetetraacetic acid (EDTA) salt as a chelating agent to the water to form an electrolytic medium that is about 2-10% weight neutral salt in the water;
   adding pH adjusters to the medium to obtain an electrolytic solution of pH in the range of 7 to 9;
   applying a potential difference across an anode and a cathode in the electrolytic solution, wherein the anode includes at least one of silver, zinc, and copper and the cathode includes an inert conductive material;
   gas sparging pressurized inert gas into the electrolytic solution;
   filtering the electrolytic solution with a filtration assembly; and
   mixing an excipient into the electrolytic solution at room temperature.

2. The method of claim 1, wherein the neutral salt is at least one of, disodium EDTA, diethylene triamine pentaacetic acid sodium salt, sodium calcium edetate, tetrasodium EDTA, dimercaptosuccinic acid, dimercapto-propane sulfonate, salts of diethylene triamine pentacetic acid, editronic acid, 1-Hydroxyethylidene-1,1-diphosphonic acid (HEDP), NTA a, and dimercaptol.

3. The method of claim 1, wherein the cathode includes stainless steel, mild steel, boron, diamond, graphite, platinum, silver, and/or copper.

4. The method of claim 1, wherein the gas sparging and the deoxygenating are performed with an inert gas including argon and/or nitrogen.

5. The method of claim 1, wherein the filtration assembly includes a peristaltic pump having a filter with an adsorption column for simultaneous filtering of the electrolytic solution.

6. The method of claim 1, wherein the excipient includes polymers and/or thickening agents.

7. The method of claim 1, wherein the excipient solution includes a polymer 1 to 5 weight percentage of the excipient solution.

8. The method of claim 1, wherein the excipient is a polymer including poly vinyl pyrrolidone, polyethylene glycol, poly vinyl alcohol, urethanes, and/or acrylates.

9. The method of claim 1, wherein the excipient is a thickening agent including at least one of, carbomer, polymers of acrylic acid, alginates, pectin, carrageenan, gellan, gelatin, agar, modified starch, methyl cellulose, and hydroxypropylmethyl cellulose.

10. The method of claim 1, wherein the cathode includes corrosion resistant materials.

11. The method of claim 1, further comprising:
    dipping the anode and the cathode in the electrolytic solution, wherein the cathode includes corrosion resistant materials; and
    applying a potential difference across the cathode and the anode to establish a flow of metal ions between the cathode and the anode.

* * * * *